US005835734A

United States Patent [19]

Alkalaj et al.

[11] Patent Number: 5,835,734
[45] Date of Patent: Nov. 10, 1998

[54] ELECTRONIC PROCESSING AND CONTROL SYSTEM WITH PROGRAMMABLE HARDWARE

[75] Inventors: Leon Alkalaj, Studio City; Wai-Chi Fang, San Marino; Michael A. Newell, Altadena, all of Calif.

[73] Assignee: California Institute of Technology, Pasadena, Calif.

[21] Appl. No.: 957,616

[22] Filed: Sep. 23, 1997

Related U.S. Application Data

[60] Provisional application No. 60/013,041, Mar. 8, 1996.

Related U.S. Application Data

[63] Continuation of Ser. No. 813,777, Mar. 7, 1997, abandoned.
[51] Int. Cl.⁶ ............................................... G06F 13/10
[52] U.S. Cl. ................ 395/284; 395/800.37; 395/182.05
[58] Field of Search ..................................... 395/280, 284, 395/182.01, 182.05

[56] References Cited

U.S. PATENT DOCUMENTS

| | | | |
|---|---|---|---|
| 5,257,387 | 10/1993 | Richek | 395/284 |
| 5,303,352 | 4/1994 | Robinson | 395/284 |
| 5,307,464 | 4/1994 | Akao | 395/284 |
| 5,313,595 | 5/1994 | Buondonno | 395/325 |
| 5,530,895 | 6/1996 | Enstrom | 395/829 |
| 5,734,872 | 3/1998 | Kelly | 395/500 |
| 5,752,032 | 5/1998 | Keller | 395/681 |

*Primary Examiner*—Eric Coleman
*Attorney, Agent, or Firm*—Fish & Richardson P.C.

[57] ABSTRACT

A computer system with reprogrammable hardware allowing dynamically allocating hardware resources for different functions and adaptability for different processors and different operating platforms. All hardware resources are physically partitioned into system-user hardware and application-user hardware depending on the specific operation requirements. A reprogrammable interface preferably interconnects the system-user hardware and application-user hardware.

2 Claims, 5 Drawing Sheets

INTERUPT MANAGEMENT

FPGA CONFIGURATION READ-BACK

ELECTRONIC PROCESSING AND CONTROL SYSTEM WITH PROGRAMMABLE HARDWARE

RELATED APPLICATIONS

This application is a continuation of the U.S. patent application Ser. No. 08/813,777 now abandoned, filed on Mar. 7, 1997, which claims the benefit of the U.S. Provisional application No. 60/013,041, filed on Mar. 8, 1996. The entirety of the U.S. Provisional application No. 60/013,041 is incorporated herein by reference.

ORIGIN OF THE INVENTION

The invention described herein was made in the performance of work under a NASA contract and is subject to the provisions of Public Law 96-517 (35 U.S.C. 202) in which the Contractor has elected to retain title.

FIELD OF THE INVENTION

The present invention relates to a computer architecture and a digital processing and control system. More specifically, the disclosure relates to a microprocessor-based system having reprogrammable hardware.

BACKGROUND AND SUMMARY OF THE INVENTION

Computer systems usually have hardware configured and designated for specific applications. A piece of hardware for one application normally cannot be used for another application. For example, a personal computer may have devices designated for cellular phone-related applications and devices designated for video-related applications. The cellular phone-related hardware often cannot be used for video-related application and the video hardware usually cannot be used for cellular phone-related applications.

For another example, a platform configured for one type of computer processor (e.g., Intel's Pentium processors) cannot be used with another (e.g., Motorola's PowerPC processors). One conventional technique to upgrade hardware is to replace a specific function hardware with newly designed hardware for that function. This needs to be done even when a minor change is made in the design.

Such conventional systems have several limitations. For example, the physical size of the system is bulky since each intended application such as cellular phone and video requires designated devices and supporting system resources. Utilization of hardware resources is also inefficient since supporting system hardware designated for one application cannot be used for another application even though the former is not in use, leaving the designated supporting system hardware unused. Moreover, a conventional computer system is not adaptable in the sense that the hardware configured for one particular group of applications cannot be used for different applications. Furthermore, co-design of hardware and software for an optimized system performance is difficult in conventional systems.

NASA's new era of miniaturized spacecraft is aimed at "faster, better, cheaper" missions. Different spacecraft missions have different tasks for data collection. Each task of data collection involves the interface between instruments and the computer through specific task system hardware and software. In the past, conventional computer systems were used for control and data acquisition/processing in many space missions. The system hardware was designed specifically to meet the requirements of each mission. Therefore, a system for one mission may not be usable for another mission.

Hence, it is desirable to design a computer system with reprogrammable hardware so that the system can be reprogrammed to adapt to not only different applications with different hardware components but to different processors on different platforms. It is also desirable to reduce the volume and mass of the system for space missions and many other portable applications.

It should be noted that the reprogrammability of the hardware in accordance with the present invention is different from the conventional "programmable hardware". Prior-art use of programmable hardware is to change the configurations of hardware during designing and testing a system, thus shortening the design cycle of the hardware. Prior-art systems as final products usually cannot be reconfigured in hardware without changing the hardware components.

A computer system incorporating a digital processor with a multichip module ("MCM") is one system configuration for light and compact computer systems. A MCM system combines a number of microelectronic circuits, e.g., a microprocessor and memory chips, by both planar integration and die stacking to form a compact and integrated system. For example, Alkalaj and Jarvis described a MCM based reduced instruction set computer ("RISC") processor having a complete 32-bit RISC processor, random access memory ("RAM"), electrically erasable programmable read only memory (EEPROM) and field-programmable gate arrays (FPGAs). See, "The design and Implementation of NASA's Advanced Flight Computing Module", in Proceedings of the 1995 IEEE multichip Module Conference, pp.40–44, February, 1995. They used a MCM with a mass less than 100 grams and a volume less than 1.5 cubic inches. Die stacking technology can be used to further increase hardware density in this type of system. This allows the system memory goals to be achieved within the given volume constraints in an application. See, for example, Tuckerman et al., "Laminated Memory: A New 3-Dimensional Packaging Technology for MCMs", in Proceedings of the 1994 IEEE multichip Module Conference, March, 1994.

The inventors recognized that reprogrammability of a MCM based computer can be implemented at system level to render the computer system flexible and adaptable. For example, the system hardware can be configured at different stages of a space mission to perform different applications needed in each stage. The inventors further recognized that such an adaptable computer architecture can be widely applied to a variety of computer systems. In particular, the computer architecture and systems are neither limited to applications in space missions nor in computer systems implemented in an MCM packaging paradigm.

The preferred computer system of the present invention includes a microprocessor, a program memory having RAMs and programmable ROMs, a first programmable hardware unit for system configurations and operating environment, a second programmable hardware unit for application configurations based on the system resources from the first programmable hardware unit, and an input/output ("I/O") system having a plurality of devices. All parts are preferably interconnected on a system bus.

It is one object of the invention to partition reprogrammable hardware into a first plurality of components designated for system configurations and a second plurality of components designated for application implementations. An interface is preferably used to interconnect the two different portions of reprogrammable hardware. This unique hardware partition incorporated with the hardware programmability allows for flexibility during both implementation and deployment cycles.

It is another object of the invention to address mass and volume issues by combining MCM technology with reprogrammable hardware. This is not only for applications in space missions but also for many other portable applications. The partitioning of the reprogrammable hardware into system hardware and application hardware allows easier implementation of time multiplexed hardware functions to be programmed when needed, enabling further mass and volume reductions over the original MCM mass reductions.

BRIEF DESCRIPTION OF THE DRAWINGS

These and other advantages of the present invention will become more apparent in light of the following detailed description of the preferred embodiment thereof, as illustrated in the accompanying drawings.

DESCRIPTION OF THE PREFERRED EMBODIMENT

System Architecture

Figure 1:
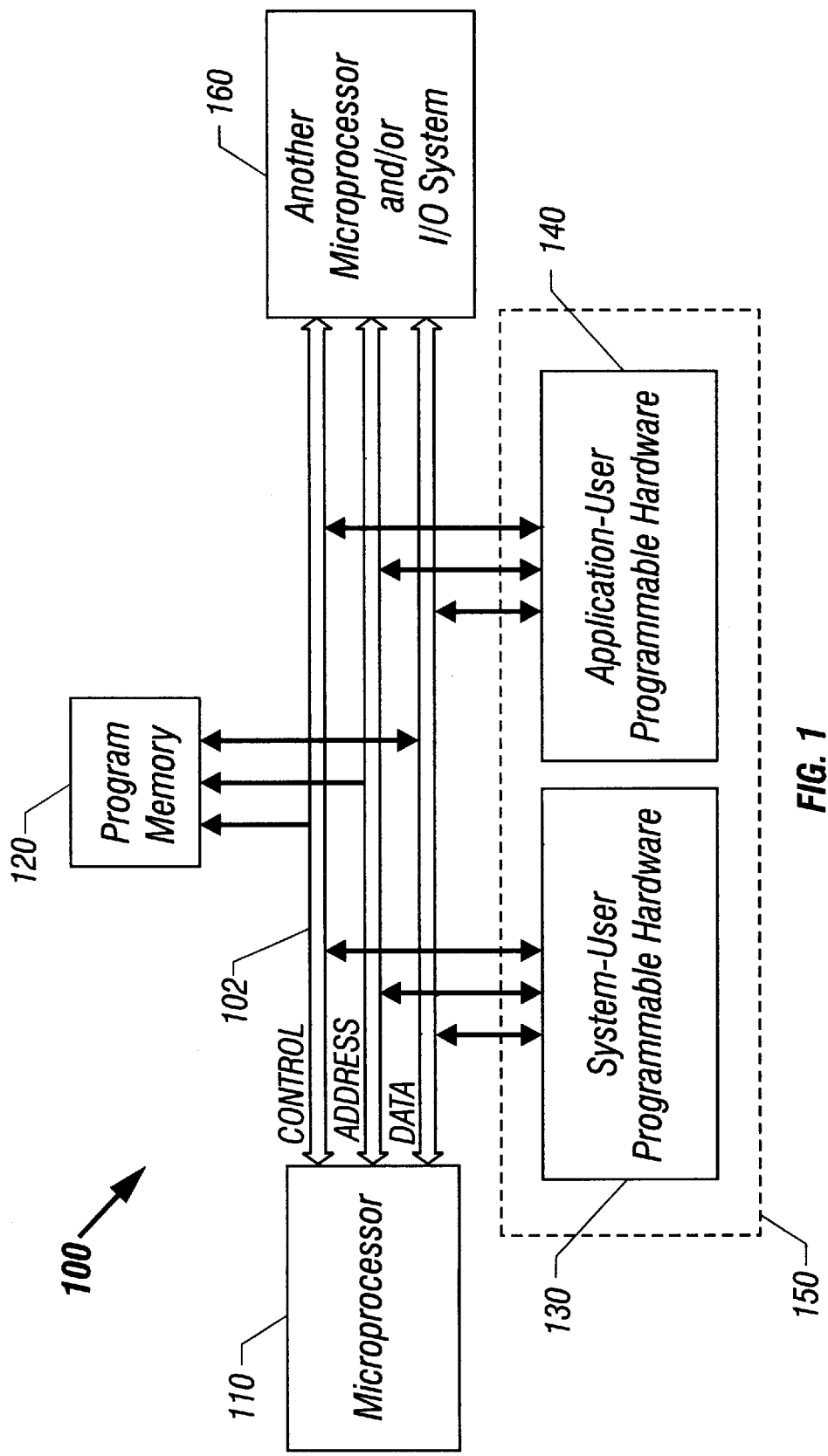
FIG. 1 is a block diagram illustrating a preferred system architecture of the invention.

FIG. 1 shows a block diagram illustrating a preferred system architecture 100 of the present invention. A generic microprocessor 110 is connected to a program memory 120 and programmable hardware 150 by a system bus 102. The bus 102 has a control line 104 for synchronization, an address line 106 for device selection and data location, and a data line 108 for transmission of data and instructions. Device 160 represents other components connected to the system bus 102, including I/O devices or/and one or more microprocessors.

Both RISC processors and complex instruction set computer ("CISC") processors can be used as the processor 110 in accordance with the invention. RISC processors are preferred herein to facilitate high data volume applications and efficient instruction execution. In particular, this system architecture can support different processors by an innovative use of the system-user programmable hardware through a hardware partitioning.

The program memory 120 preferably can be partitioned to allow flexible memory allocation for different programs. A dynamically allocation mechanism also can be implemented. A number of memory devices can be included in the program memory 120, including but not limited to, RAM devices and reprogrammable ROM devices. The present invention preferably allows access to the memory devices (e.g., configuration memory units) in the programmable hardware 150.

The programmable hardware 150 preferably has two parts, system-user programmable hardware 130 and application-user programmable hardware 140. The system-user programmable hardware 130 includes hardware components that are designated for system configurations and are accessible by a system user. For example, the system-user hardware can include the CPU, the memory, I/O components for the CPU. The application-user programmable hardware 140 includes hardware components that are designated for application configurations and are accessible by an application user. For example, video, CDROM drive, data compression hardware can be partitioned as application-user hardware. In general, hardware partitioning is dependent on the specific system requirements. A system-user hardware for one system can be an application-user hardware for another system. This hardware partitioning architecture contrasts with the prior-art use of reprogrammable hardware including previous use of reprogrammable hardware in the MCM implementations.

1. System-User Programmable Hardware

The system-user programmable hardware 130 can be configured by a system user so that different processors can be used, i.e., the system is processor-transparent. Therefore, the system architecture 100 can use a processor to its advantages depending on the requirements of an application. Also, this allows choosing a particular processor to match an application software that is needed for a task.

There are a number of distinct system hardware functions that support a modern RISC processor, including, but not limited to:

(1) Interfacing the processor data transfer protocol with system and peripheral hardware This allows a two-fold flexibility. First, it allows any processor to replace the processor used in the system; Second, it allows hardware specifically designed for one processor to be interfaced to another different processor in the current system configuration.

(2) Memory and I/O management functions

This allows for completely new memory allocations to be made at any time. For example, many computers require that all system RAMs are of the same type. Thus, when RAM is upgraded, all the system RAMs have to be of the same type. Therefore, for example, in order to upgrade from 4 MB to 16 MB of DRAM, all RAMs need to be of 16 MB size. This makes the original 4 MB RAMs unusable and obsolete. The present invention overcomes this problem. The system user can reprogram the system-user hardware so that system resources can be controlled and reconfigured to use both the existing RAM in an upgrade and the newly installed possibly different RAM.

(3) System interrupt resource management

The present invention allows the number of interrupts to be optimized for needed system performance. The number of allowed interrupts is increased when the system interfaces to a large amount of hardware devices. On the other hand, the number of interrupts is decreased when the system needs to optimize for speed or other functions.

A number of capabilities become possible by having these system hardware functions implementation in programmable hardware. One significant capability is the ability to implement only the necessary system hardware for a specific operating environment.

External device data transfer protocols can be converted to the processor data transfer protocol in the system-user programmable hardware, enabling interfaces to existing bus architectures. Depending on the definition of system devices, control of peripherals such as mass storage, displays, etc. can be included in the system-user programmable hardware.

By defining a data transfer protocol for the programmable hardware composed of generic READ, WRITE and ADDRESS signals, a flexible control bus is developed to interface to a processor. This conversion from the system processor control signals to a generic programmable hardware control bus is consigned to the system-user. Indeed this system user to programmable interface can be implemented currently with 64 bit or wider buses in mind, so that when such busses are available, the system hardware can be reprogrammed to accept the wider bus.

2. Application-User Programmable Hardware

The application-user programmable hardware allows application users to design efficient algorithms or applications in hardware to achieve complex hardware-software co-designs.

One unique aspect is that the system hardware configuration is transparent to an application user. The system hardware configuration includes, for example, the specifics of a processor used and what other hardware functions are configured in application-user hardware.

The application-user programmable hardware also provides flexibility for application users to implement time multiplexed hardware configurations. For example, a task involving sequential measurements of temperature and pressure is carried out by first configuring the system hardware resources to measure the temperature with a temperature sensor controlled by the computer. As the temperature measurements terminates, the system can use the same system hardware resources or at least a portion of the components that are used for temperature measurements by reprogramming to support the pressure measurements. Such sharing of the reprogrammable hardware can significantly reduces the amount of hardware needed in a system, thus reducing the cost, volume, and mass of a system. This unique hardware partition and programmability reduce the number of hardware components that are needed, resulting in a simpler system with reduced volume and weight without sacrificing functionality.

Data compression is an important user application. For example, the amount of data collected by spacecraft in a space mission is usually large. Storage of data on board requires high capacity storage devices and the speed of data transmission to a ground station is usually restricted by the limited bandwidth of the available communication channels. Thus, it is desirable to compress the data to save storage space and increase the transmission speed. In a typical space mission, multiple sensors of different types are used to collect data. Data from some sensors require high fidelity therefore lossless compression schemes are applied thereto. Data from some other sensors may not require high fidelity such as image data. A different compression scheme may be used with image data to achieve high compression ratio with possible loss of some non-critical information. Implementation of different compression schemes usually requires different hardware components. In addition, different sensors may be used to collect different data at different phases or stages of a mission.

The present invention can be used in such a situation to include the compression hardware components into the application-user hardware. Hence, the compression hardware components can be programmed to perform a compression for image data in a phase when the image sensor is activated to collect image data. In another phase of the mission, the same compression hardware components can be reprogrammed to preform a lossless compression on data that requires high fidelity.

Other functions and corresponding hardware can be included in the application-user hardware include:

(1) Interfacing of an external data transfer protocol with the processor data transfer protocol This allows for other data transfer protocols such as PCI, PCMCIA, ISA, SCSI, VME, FutureBus, etc. along with interface techniques not yet designed to be implemented at any time, and indeed replaced as needed in time to allow for maximum connectivity.

(2) Specialized system specific, hardware resources such as, event timers, real time clocks, serial, parallel keyboard, and mouse interfaces. Various disk drive, display, and CD-ROM controllers, audio modem, and phone interfaces, along with power saving functions.

Interface between Partitioned System/Application Hardware

An interface is preferably used to interconnect the partitioned system-user hardware and application hardware for a desired system. By defining a data transfer protocol for the programmable hardware composed of generic READ, WRITE and ADDRESS signals, a flexible control bus is developed to interface to system-user hardware including a processor. This conversion from the system processor control signals to a generic programmable hardware control bus is consigned to the system-user. Indeed this system user to programmable interface can be implemented currently with 64 bit or wider buses in mind, so that when such busses are available, the system hardware can be reprogrammed to accept the wider bus.

The following are factors that can be included in forming the interface between the system-user hardware and application-user hardware:

(1) Address, data and control busses are connected to system-user hardware and application-user hardware.

(2) The interface allows the programmable system hardware to communicate with programmable application hardware through a decode logic. An N-bit address communication can be implemented between the partitioned hardware portions to allow $2^N$ address locations to be accessed. In a prototype system described herein, a 4-bit address is used to address up to 16 devices. A command/status register can be implemented to control or command the hardware board, allowing feedback of status back to the processor. The command/status register can be in form of internal registers connected to the control line of the system bus 202.

Coordinating Reprogrammable Hardware with Operating Systems

A registry of programmable hardware resources (e.g., information on RAMS or a hardware allocation table) and partitioning information is preferably implemented. This optimizes use of hardware and software resources in a computer system partitioned into system and application user reprogrammable hardware in accordance with the present invention. The registry of hardware resources is kept on memory that is accessible to both Software and reprogrammable Hardware for both system users and application users.

This registry expands on the contemporary definition of a system registry, allowing the reprogrammable hardware to access the registry autonomously from the software (more specifically the operating system) so that system and application users can keep track of and optimize the programmable hardware when dynamically changing new programmable hardware components. Operating system software can access this system registry to inquire about the current state of the functions defined by the reprogrammable hardware, and then request the loading of new hardware functions. This can be done if the hardware needed to perform a specific task is not configured, or to reconfigure or load an upgrade of a new version of hardware (e.g., a new sound card for a PC).

In addition, the system registry can benefit from the use of the configuration readback circuit described later in a prototype system to compare actual hardware configuration with a desired programmable hardware configuration. If the actual configuration is different from the desired configuration, the system can correct the difference by reprogramming the system into the desired configuration.

A Prototype System with Multichip Module Packaging

A MCM based computer can be used for space missions with requirements for 32-bit processing power and very small mass and volume. There is a strong motivation for internal programmable hardware that would eliminate external hardware implementing user I/O or specialized hardware algorithms. The inventors built a prototype system based on the preferred system architecture 100. The prototype system describe herein is only an example for illustrating the present invention and some specifics thereof should not be construed as limitations of the present invention.

Figure 2:
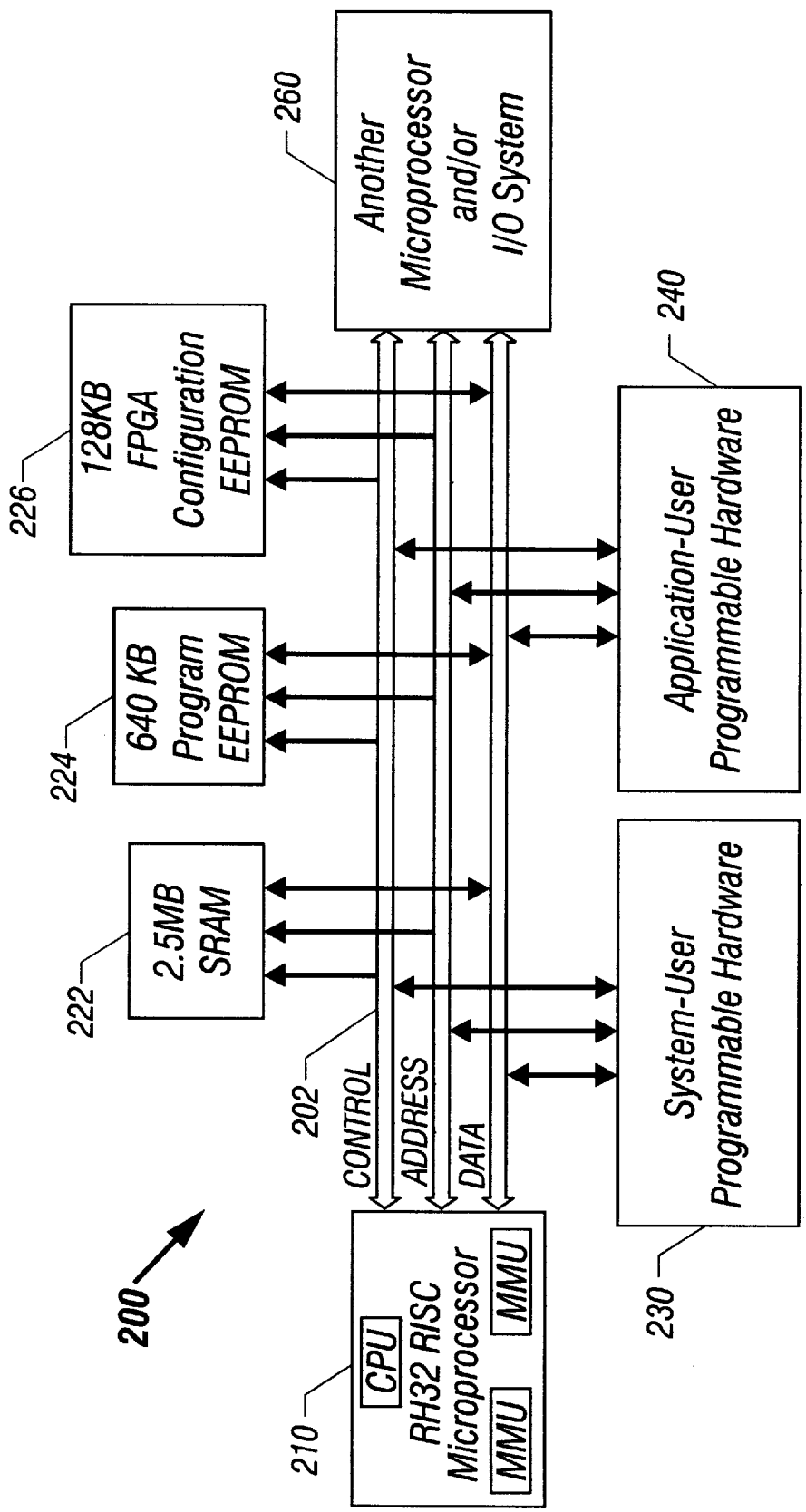
FIG. 2 is a block diagram showing the system layout of a prototype computer system in accordance with the present invention.

FIG. 2 shows a block diagram of the prototype system 200. A TRW Inc.'s RH32 processor chip set 210 is used as the microprocessor which provides a 32-bit RISC processor and two memory management units for separate instruction and data caching. The program memory has three memory devices, a 2.5 MB static RAM 222, a 640 KB EEPROM 224, and a 128 KB EEPROM 226 configurable by field-programmable gate arrays (FPGA). These memory devices are die stacked to reduce the system volume. The entire system is packed in a 2 by 4 by 0.25 inch Aluminum Nitride package. The prototype system has a processing power of 20 MIPS, i.e., $2 \times 10^7$ instructions per second.

The programmable hardware is implemented in a set of four RAM-based FPGAs manufactured by Xilinx Inc. The configuration data for the programmable FPGAs is stored in 128 Kbytes of EEPROM which is accessible by the processor 210. The EEPROM is large enough to store multiple (eight completely different) hardware configurations, and can be modified by the RH32 or other bus masters. The prototype system partitions the pool of FPGAs into system programmable hardware 230 and application programmable hardware 240 with about 60% of the FPGAs in system-user programmable hardware 230.

Figure 3A:
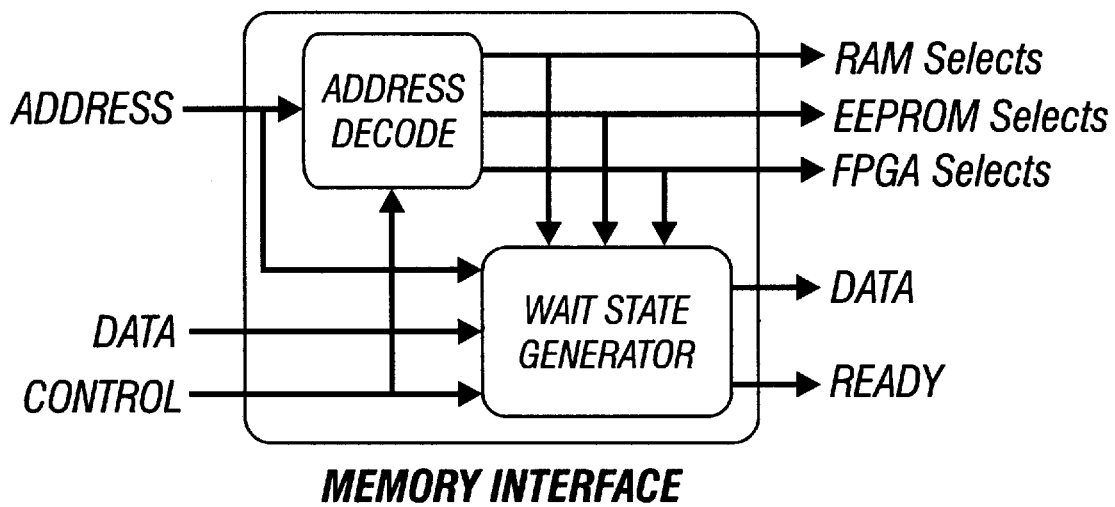
FIGS. 3a–3d are block diagrams showing devices for system-user hardware and application-user hardware implemented in the prototype system in accordance with the present invention.
Figure 3B:
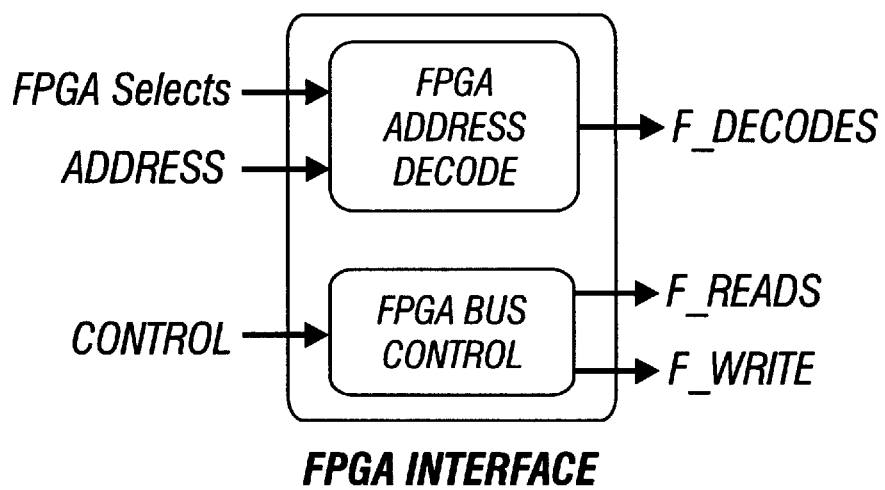
Figure 3C:
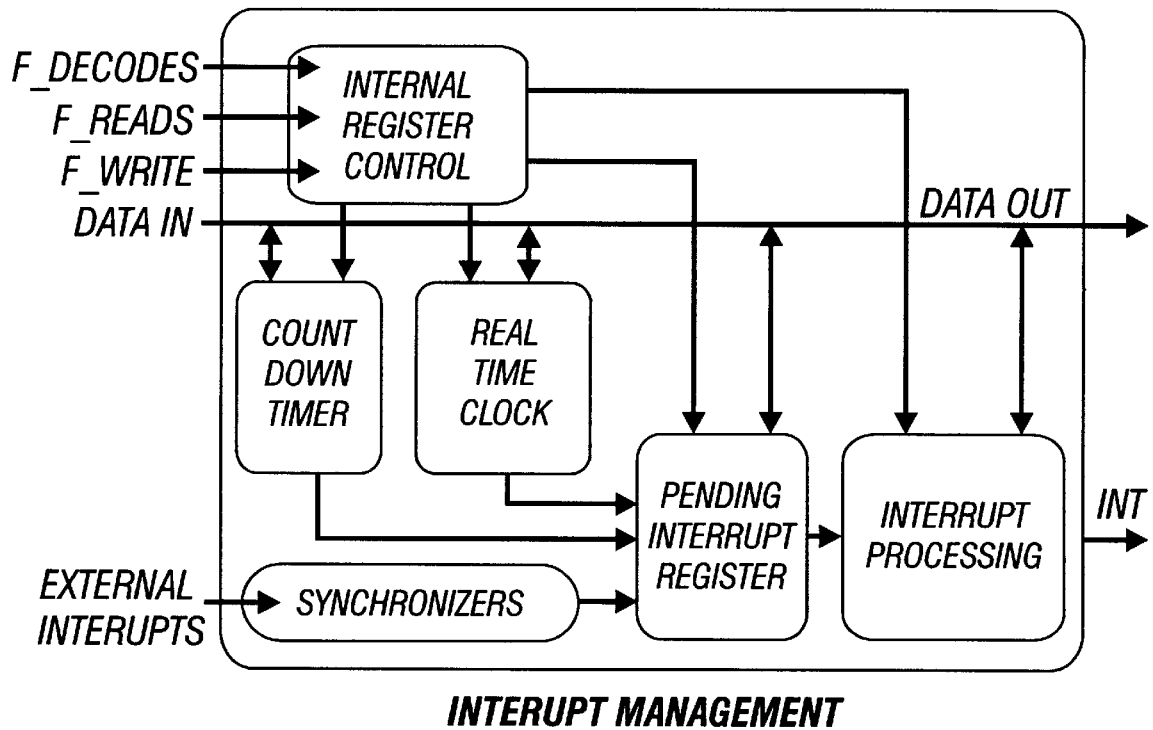

FIGS. 3a–3c show the programmed system-user functions implemented in the prototype system 200. The system-user functions include: the processor to memory interfaces including the memory configuration or map, and the wait state timing required for synchronization with the processor (FIG. 3a), the conversion from the system processor control bus to the generic programmable hardware (FPGA) control bus (FIG. 3b), and interrupt timer management which allows for 16 interrupts, timers, and a real time clock (FIG. 3c).

Figure 3D:
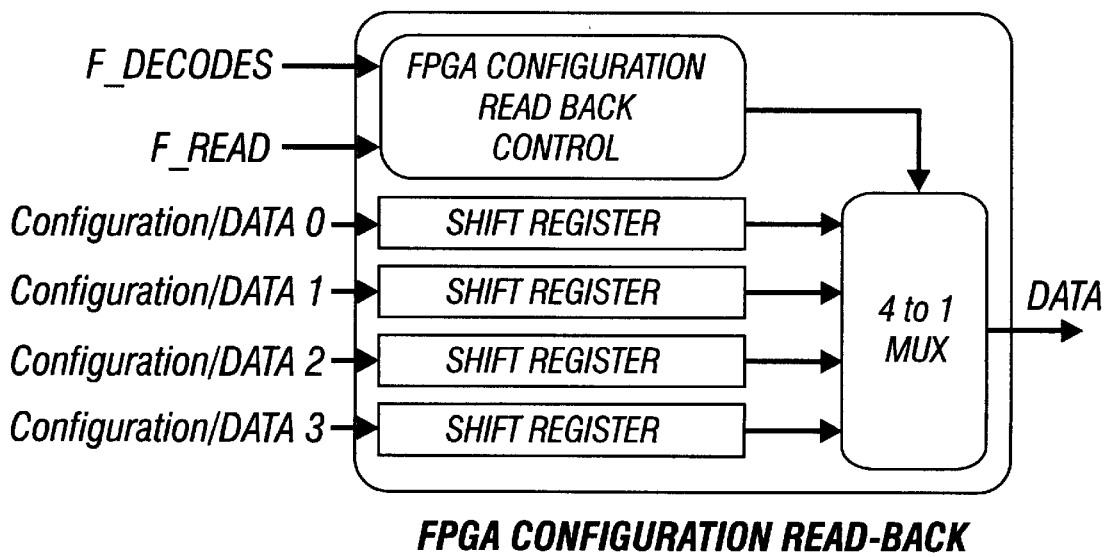

FIG. 3d shows a FPGA configuration read-back circuitry for the application-user programmable hardware. This is a system constraint driven by reliability in the radiation environment of space since space particles may alter the settings of logic gate arrays. The configuration read-back circuitry allows the programmed hardware to be compared with the EEPROM used to program it. This capability allows detection of changes in the RAM-based programmable hardware configuration caused by Single Event Upsets (SEUs).

The MCM prototype is constructed using nCHIP Inc.'s Silicon Circuit Board (SiCB) technology. The Silicon Circuit Board is a silicon wafer with an internal de-coupling capacitor and routing wires deposited on silicon dioxide layers. This allows high-density interconnects between system components. The SiCB's integral capacitor eliminates the need for numerous de-coupling capacitor die that would otherwise use valuable die placement area. The fine interconnect wire pitch, no decoupling capacitor die, and die stacked RAM enable the packing of 33 separate die in the MCM. Table I shows the MCM physical characteristics obtained by using these choices.

TABLE I

| MCM PHYSICAL CHARACTERISTICS | |
| --- | --- |
| Mass | 100 grams |
| Volume | 1.5 inches$^3$ (2" × 4" × 0.25") |
| Number of Die | 33 |
| Power | 7.5 Watts @ 25 MHZ |
| Number of Package Pins | 442 |
| Page Material | Aluminum Nitride |

The potential problem of heat transfer in such a densely populated circuit is mitigated by use of an Aluminum Nitride package (e.g., manufactured by Coors), which has excellent thermal transfer characteristics, as well as a low coefficient of expansion, that prolongs the component and interconnection life.

Figure 4:
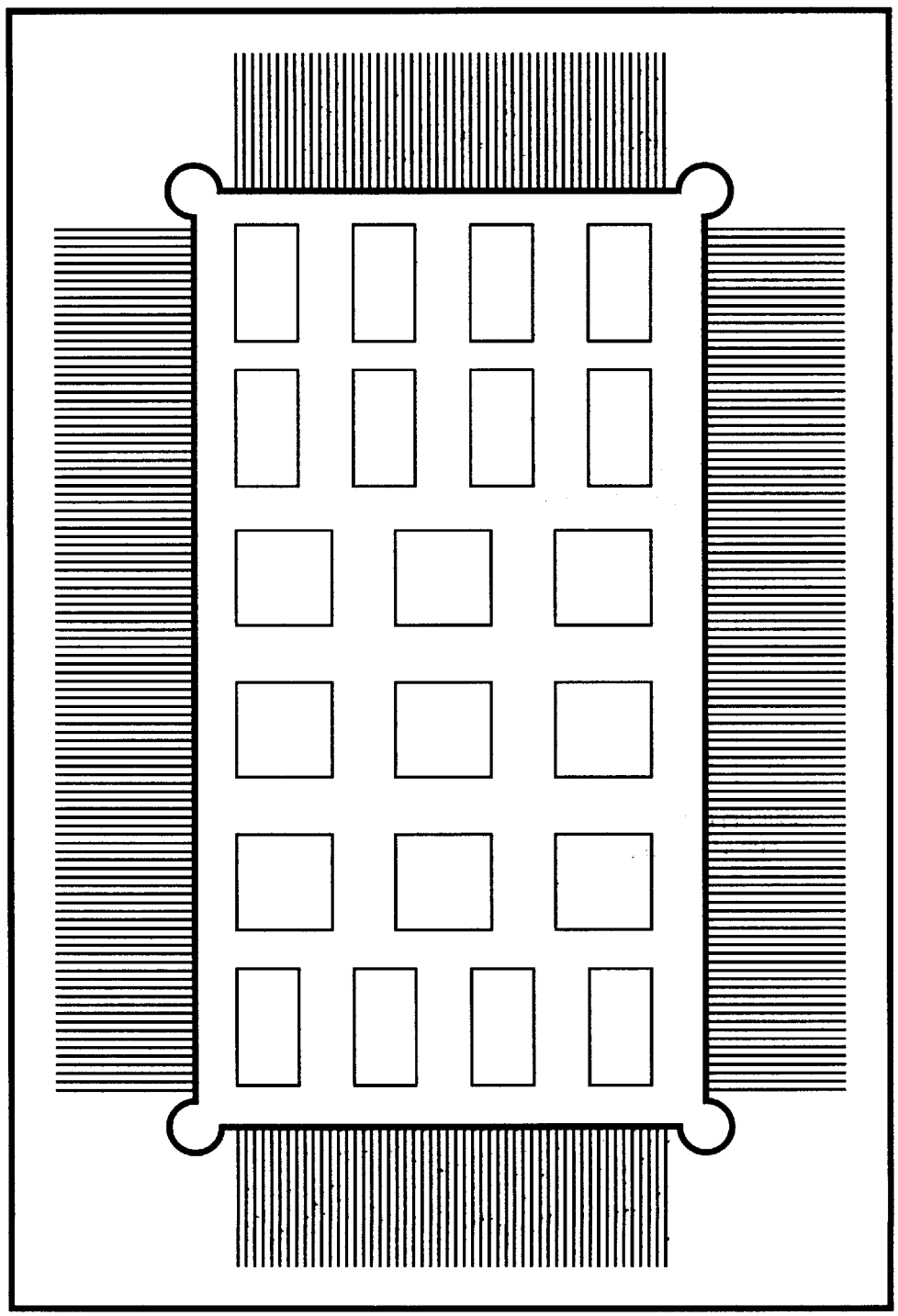
FIG. 4 is a schematic showing the prototype system package.

FIG. 4 shows a picture of the completed MCM. The current implementation with Xilinx FPGAs has a limitation in that if function changes on a single FPGA, all functions need to be reloaded. This is, however, not a limitation of the present invention but a limitation caused by the off-the-shelf components from Xilinx.

Partial reconfigurability can be implemented in accordance with the invention using other FPGAs. For example, the advancement of partial reconfigurability of an SRAM FPGA from companies such as Atmel, strengthens the implementation of the system user and application user concept, and brings the ability to have a reconfigurable personal computer one step closer.

Although the invention has been described in detail with reference to a preferred embodiment, one of ordinary skill in the art to which this invention pertains will appreciate that various modifications and enhancements may be made without departing from the scope and spirit of the invention, which are further defined by the following claims.

What is claimed is:

1. An electronic system, comprising:

a central processing unit;

a system bus having data, address, and control channels, connected to said central processing unit;

a system-user hardware unit connected to said system bus and having a first plurality of hardware components that are reprogrammable, operating to configure system operation conditions; and an application-user hardware unit connected to said system bus and having a second plurality of hardware components that are reprogrammable, operating to configure application operation conditions.

2. A system as in claim 1, further comprising an interface between said system-user hardware unit and application-user hardware component.

* * * * *